United States Patent
Albanese et al.

(10) Patent No.: US 7,139,834 B1
(45) Date of Patent: Nov. 21, 2006

(54) DATA ROUTING MONITORING AND MANAGEMENT

(75) Inventors: Michael J. Albanese, Los Gatos, CA (US); James Roland Henderson, Morgan Hill, CA (US)

(73) Assignee: Avvenu, Inc., Palo Alto, CA (US)

( * ) Notice: Subject to any disclaimer, the term of this patent is extended or adjusted under 35 U.S.C. 154(b) by 649 days.

(21) Appl. No.: 09/843,249

(22) Filed: Apr. 26, 2001

(51) Int. Cl.
- *G06F 15/173* (2006.01)
- *G06F 15/15* (2006.01)
- *H04M 9/00* (2006.01)

(52) U.S. Cl. .................. 709/238; 709/217; 709/239; 709/240

(58) Field of Classification Search ........ 709/238–244, 709/223, 224, 217
See application file for complete search history.

(56) References Cited

U.S. PATENT DOCUMENTS

| | | | | |
|---|---|---|---|---|
| 4,979,118 | A * | 12/1990 | Kheradpir .................... | 709/241 |
| 5,774,660 | A * | 6/1998 | Brendel et al. .............. | 709/201 |
| 5,862,325 | A * | 1/1999 | Reed et al. .................. | 709/242 |
| 5,920,701 | A * | 7/1999 | Miller et al. ................ | 709/228 |
| 6,006,264 | A * | 12/1999 | Colby et al. ................ | 709/240 |
| 6,067,565 | A * | 5/2000 | Horvitz ....................... | 709/218 |
| 6,112,225 | A | 8/2000 | Kraft et al. | |
| 6,167,438 | A * | 12/2000 | Yates et al. .................. | 709/216 |
| 6,308,209 | B1 * | 10/2001 | Lecheler ..................... | 709/224 |
| 6,577,601 | B1 * | 6/2003 | Wolpert ....................... | 709/241 |
| 6,678,244 | B1 * | 1/2004 | Appanna et al. ............. | 370/229 |
| 6,697,333 | B1 * | 2/2004 | Bawa et al. ................. | 370/238 |
| 6,751,664 | B1 * | 6/2004 | Kogan et al. ................ | 709/238 |
| 2002/0174246 | A1 * | 11/2002 | Tanay et al. ................. | 709/238 |

OTHER PUBLICATIONS

Ben Hammer, "GPS to do wonders for wireless browsing" posted on the world wide web, May 25, 2000.
"BackWeb® Foundation 5.5 Technical White Paper", Nov. 1999.

* cited by examiner

*Primary Examiner*—Zarni Maung
*Assistant Examiner*—Hassan Phillips
(74) *Attorney, Agent, or Firm*—Crawford Maunu

(57) ABSTRACT

Data transfer over an IP network is effected in a manner that improves the use of available communications channels and makes possible enhanced data routing control and monitoring. According to an example embodiment of the present invention, data is transferred over an IP network having a plurality of communication links. An origin node coupled to the network supplies data to the network, and system nodes coupled to the network are adapted to store at least a portion of the data supplied by the origin node. Two or more servers are adapted to route data between at least one of the system nodes and the network. A network-distributed application routing controller is implemented throughout the network and ascertains location information of the data supplied by the origin node. A data request from one of the system nodes is received at the application routing controller. In response to the request, the supplied data is routed from a node on the network over at least one of the servers and via one or more communication links to the node at which the request has been made.

20 Claims, 6 Drawing Sheets

DATA ROUTING MONITORING AND MANAGEMENT

FIELD OF THE INVENTION

The present invention relates generally to communications and, more particularly, to data routing over a network.

BACKGROUND OF THE INVENTION

Network data communications over Internet protocol (IP) and other networks have increased at an astonishing rate over recent years. The affordability and availability of computers, IP telephones, wireless IP devices and other network access appliances has made their use prevalent in a variety of applications. In addition, as access to the Internet and other networks becomes easier, these mediums are increasingly used for data transfer applications. For example, data for computer software, music, video, news services, games and other applications is being requested and delivered via the Internet. Today, the number of network subscribers, data providers, and requests by those subscribers for data transfer are growing exponentially faster than the capability of current data transfer systems are expanding to meet the demand. In addition, the limitations of current systems restrict the ability to meet the demand in an efficient and affordable manner.

For many communication applications, the increase in use and lack of availability of data transfer requires the creative use of communications channels. To meet these and other data transfer needs, networks have been enhanced both in the ability to process larger quantities of data and in the ability to process data at a higher rate of speed. In addition, network access appliances have been improved to increase the speed at which data can be transferred. However, as the demand for high quantity and quality data transfer increases, these needs become more difficult to meet.

One challenge to data transfer on the Internet stems from the inflexibility of data transfer channels. For example, if a data supplier sells data to an end user via the Internet, the end user typically downloads the data using one of only a handful of download locations operated at the control of the supplier. This type of operation can be cumbersome and expensive because the data may have to travel a significant distance and thus take up more time and space in the communications network. In addition, the transfer of data is limited by the location of the download locations.

Another challenge to effective network data transfer has been the inability to effectively use communications channels to manage the transfer of data. For example, various communications channels have sufficient bandwidth to transfer a variety of data simultaneously. However, the nature of data transfer in the past has often left excess data transfer capability in some communications channels unused, while other channels are overloaded and unable to meet transfer needs. In addition, network data transfer typically has high and low periods of traffic that are related to the time of day that the data is being transferred. For instance, business users often move data during daytime hours and consumers often move data during nighttime hours.

Still another challenge to network data transfer is to track the location and transfer of data for purposes including billing and data management. Tracking of data transfer is useful to subscription and other content providers to generate billing for users of the content. For instance, music, movies and other content delivered via the Internet need to be tracked to accurately bill a user requesting the content.

The inability to effectively and efficiently manage large quantities of data transfer via communication networks and the Internet is a hindrance to the advancement of technologies and trade channels that use or could use network-based data transfer.

SUMMARY OF THE INVENTION

The present invention is directed to a method and system for data routing in a network. The present invention is exemplified in a number of implementations and applications, some of which are summarized below.

According to an example embodiment of the present invention, a system is adapted for directing data on an Internet protocol (IP) network having a plurality of communication links. The system includes an origin node coupled to the network and adapted to supply data to the network, and a plurality of system nodes are coupled to the network and adapted to store at least a portion of the data supplied by the origin node. A plurality of servers are adapted to route data between at least one of the system nodes and the network. An application routing controller is coupled to the network and adapted to ascertain location information of the data supplied by the origin node, to receive a data request from one of the plurality of system nodes and to direct routing of the supplied data from a node on the network to the node to which the data has been requested to be delivered. In response to the ascertained data location information, the routing is directed via one of the plurality of communication links.

According to another example embodiment of the present invention, data is moved on an Internet protocol (IP) network having a plurality of communication links and a plurality of system nodes. Data is supplied to the network via an origin node, and at least a portion of the data supplied by the origin node is stored at a system node. A data request from one of the plurality of system nodes is received, and location information of the data being requested is ascertained. In response to the ascertained data location information, routing of the requested data is directed from a node on the network to the node to which the data has been requested to be delivered. The data is then routed between at least one of the system nodes and the network.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
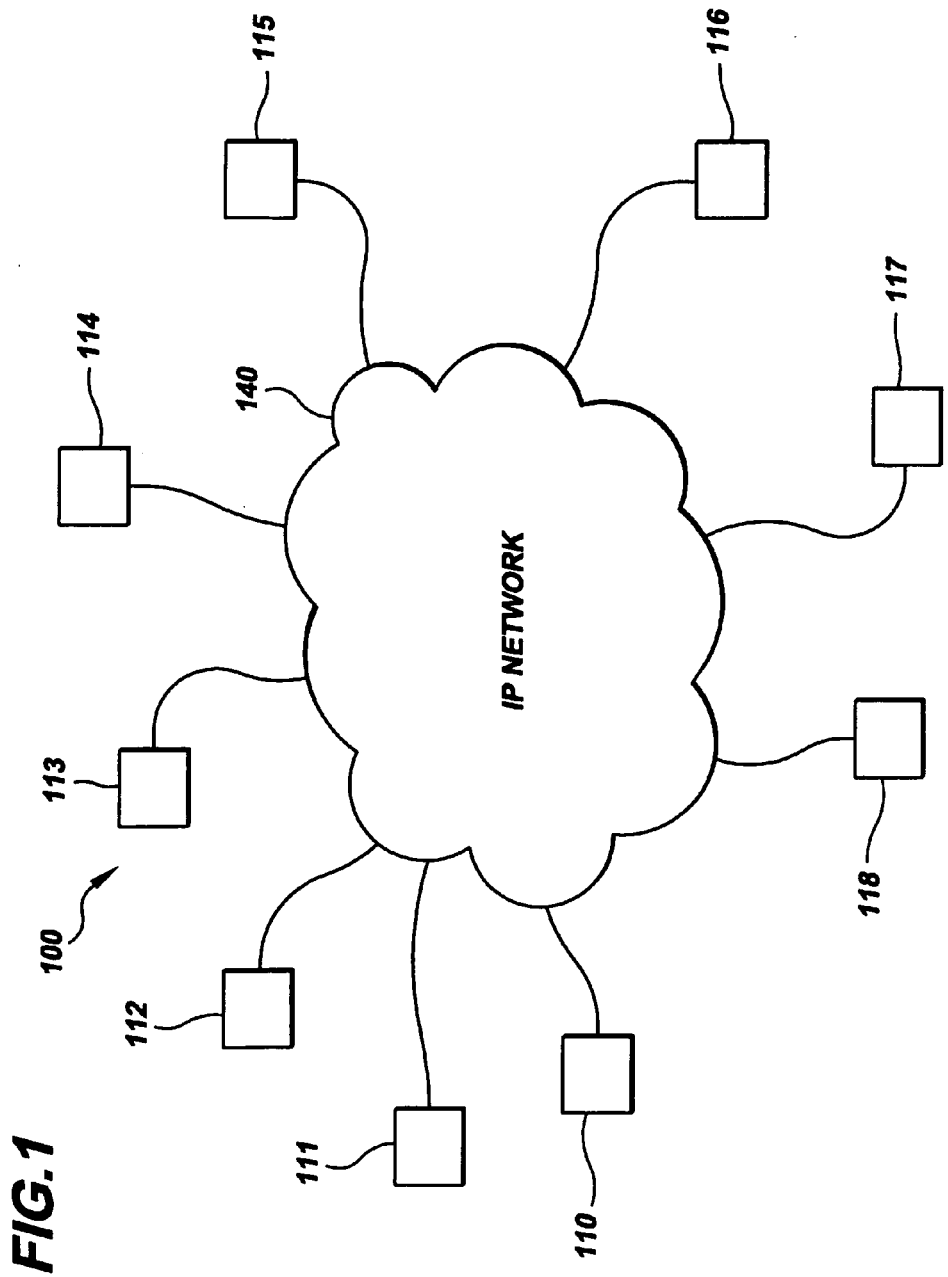
FIG. 1 is a system for routing data via an IP network, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable for a variety of different types of scheduled and/or trackable data communications, and the invention has been found to be particularly suited for data routing on a network such as data-rich media over the Internet. While the present invention is not necessarily limited to such applications, various aspects of the invention may be appreciated through a discussion of various examples using this context.

According to an example embodiment of the present invention, targeted data is routed over an IP network using a path selected to provide efficient use of the network. The movement of the data is tracked as well as the routing and location of the data, and users who receive the data are billed, e.g., as a subscriber of the system. In one implementation, data is supplied to the IP network via an origin node, such as a media provider, software provider, or other data provider. A plurality of system nodes are coupled to the network and adapted to provide the network information including the type of data located at the system node, and is adapted to receive data from the network, such as the data supplied by the origin node. The system nodes may include for example, a network server, a business server and/or a user node including an Internet access appliance such as a computer. Each system node is coupled to at least one server that routes data between one or more of the system nodes and the network. An application routing controller is coupled to the network and receives the data location information from the plurality of system nodes. The routing controller may include, for example, a software-based application level router and/or a network application router. The routing controller receives a data transfer request to one of the plurality of system nodes. In response to the request, the controller directs routing of the supplied data from a system node to the node to which the data has been requested to be delivered via at least one of the servers.

The data transfer can be efficiently directed across the network in a variety of manners based on the application of interest. One example application is directed to end-users of requested data who do not use their network terminals at specific periods of each day. These specific periods are assumed to be periods in which the network can be used at relatively low cost, such as during late night and early morning hours or at other times when network traffic is relatively low in relation to high-traffic periods. The application routing controller is programmed to transfer data during the low-cost periods. During these periods of low network use, local data-transfer channels that are typically congested during higher use periods are available for information transfer. Using these local channels requires fewer network hops, or overhead, to effect the data transfer, and corresponding communications charges are decreased. For example, when requested data does not have to be delivered immediately, the router schedules the data delivery to occur during a selected reduced-cost period. If the requested data is not due at its target destination in a time frame that covers multiple low-cost periods, the data can be sent in segments; for example, a movie requested for viewing two days in advance can be separated so as to employ sequential 2:00 AM one-hour data-transfer periods. Advantageously, an end-user viewing this transferred movie incurs relatively little costs associated with the transfer of the data over the network and with usage of the user's network terminal in receiving the transferred data. Various other example cost-related applications are discussed hereinbelow, with particular example embodiments illustrated in connection with the Figures, including FIGS. 1, 2, 3 and 5.

In another implementation, the application routing controller is programmed to transfer data using a priority associated with each set of data. In one example, data having a high priority is transferred before data having a lower priority. The priority is determined using selected parameters, such as a premium paid by a user to obtain high priority, or a need to maintain real-time data transfer, such as for streaming audio and/or video. In another example, the priority is used to determine the path through which the data is to be transferred. For instance, data having a higher priority may be sent via a higher-cost route if that route effects the transfer more quickly than a lower-cost route, if the priority is such that relatively higher-cost transfer is acceptable. This is particularly useful when low-cost data transfer channels are at capacity and when service outages occur for preventive maintenance or as a result of equipment failure.

In another example embodiment of the present invention, the system is further adapted to track transferred data and to provide information regarding the transferred data. The tracked data is used for purposes such as billing and management of future data transfers. This is particularly useful for managing individual user accounts and for enabling efficient transfers of the data to subsequent users, based on the location of the transferred data. For example, a data provider can tie billing information to the user based upon the data that is sent to the user. This is useful for charging a customer for both the actual data delivered and the cost of the data transfer. Alternatively, the data tracking information is sent to a communications utility over which the transfer is effected, and the communications utility uses the information when charging either the data provider or the user for the data transfer.

The network is flexible and adaptable for control and delivery of data such as audio, video, software, email, and other data. In one example embodiment, a movie data provider supplies one or more movies to the network via the origin node. A user at a user node selects a movie to be delivered using, for instance, a subscription package or a pay-per-view selection website hosted by the movie provider. The application routing controller receives notification of the movie selection and uses data location information sent to it by the system nodes to determine if one or more copies of the movie are available from one of the other system nodes. If the movie is available from more than one system node, the application routing controller determines the cost of transferring the movie data from each node having the movie and directs the transfer from the least expensive system node. If no copies are available, or if existing copies are not feasible for transfer due to routing conditions or other restraints, a new copy is provided by the movie data provider and routed to the requesting user.

In another example, software is delivered in a manner similar to that described hereinabove regarding movie data. The user orders software from a software provider's host website, and the application routing controller receives notification of the software selection. Location information of the software data is used to determine the availability of the software for delivery to the user, and the software data is routed to the user in a manner that effects the transfer using a least-cost alternative that meets the needs (e.g., within a selected time period) of the data transfer.

In another example embodiment of the present invention, the IP network includes a replication device adapted to replicate data and send the replicated data to two or more users. This is particularly useful, for example, when similar or identical data is being sent to two or more users. The distance that data travels can be reduced by the use of the replication device because the data source has to send less data over the network. For instance, when a selected file is to be transferred to two users, the router identifies the location of the users and a replication device near both users. If routing one file to the replication device, replicating the file and routing each replicated file from the replication device to the end users is less expensive than directly routing two files from the source to the end users, the replication device is used.

In another example embodiment of the present invention, data is transferred for use in streaming applications, such as for live concerts and sporting events, or for playback of recorded movies and recorded audio. In this application, it is necessary for the data to reach the destination in a manner that enables playback with little or no interruption and at or near a specific requested time. In live applications, delivery of the streaming data is effected with a selected delay period that accommodates for data transfer time and makes uninterrupted playback easier. The delay is preferable as short as possible (e.g., not unlike "live" broadcasts via radio waves), and is extended as necessary to accommodate network traffic and computation time. The router is programmed to select the least-cost data transfer path while maintaining an uninterrupted playback. In some instances, this involves using multiple sources to supply a streaming event to a single user. The data is sent in packets, and the router selects the least-cost routes that insure the user receives sufficient packets that can be reassembled at the user's node quickly enough to maintain the streaming application.

The Figures show and describe various specific example applications of the present invention. For instance, FIG. 1 shows a system 100 adapted to route data using an IP network 140, according to an example embodiment of the present invention. The system includes a plurality of nodes 110–118, including at least one system node and at least one origin node. The IP network includes a router adapted to receive a data routing request from one of the nodes. Each node is further adapted to provide the router with data location information that includes an indication of the type of data that is stored at the particular node. The router uses the data location information to determine a routing solution for delivering the requested data to the node. In a particular implementation, node 110 is an origin node that supplies a data set to the IP network. When node 113 makes a request for the data set, the router uses the data location information to identify any of the nodes 111–118 that contain the data set. Once the nodes are identified, the router determines a cost for effecting the transfer from the identified nodes as well as from the origin node 110, and directs the data transfer that is associated with the least cost.

Figure 2:
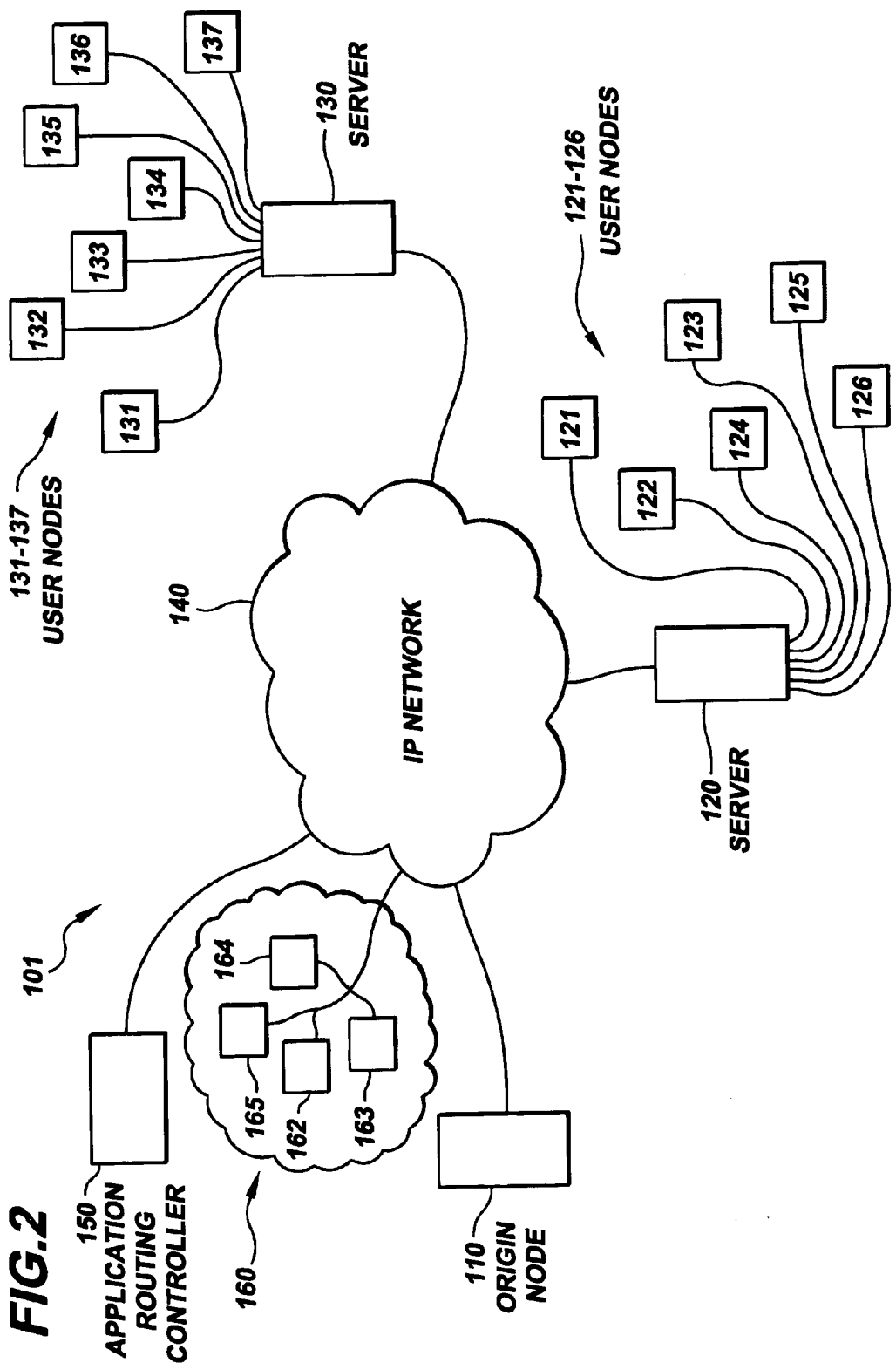
FIG. 2 is a system for routing data via an IP network, according to another example embodiment of the present invention.

FIG. 2 is a system 101 adapted to route data, according to a more specific example embodiment of the present invention. The system includes an IP network 140 that is coupled to an origin node 110, an application routing controller 150 and servers 120 and 130. Each of the servers is coupled to a plurality of system nodes 121–126, and 131–137, respectively. In one implementation, the servers include edge servers operated by a local Internet service provider (ISP), and provide access to the IP network to a plurality of users, each having one or more computers at a node. The application routing controller 150 is adapted to route data requested at one of the system nodes to the requesting node using one or more data routing parameters such as those discussed herein.

In a more particular example embodiment of the present invention, the application routing controller uses a pod (e.g., a replication system) 160 having a plurality of replicators 162, 163, 164, and 165. The pod 160 is coupled to the IP network and used for replicating data. In one implementation, the application routing controller is adapted to communicate with and control the pod. The communication and control includes one or more of: effecting the replication of a file, receiving notification of a file receipt at the replicator and obtaining information regarding the state of replication of particular data at the replicators. For instance, when a replication has been completed, the replicators notify the application routing controller 150 that it is complete.

Figure 3:
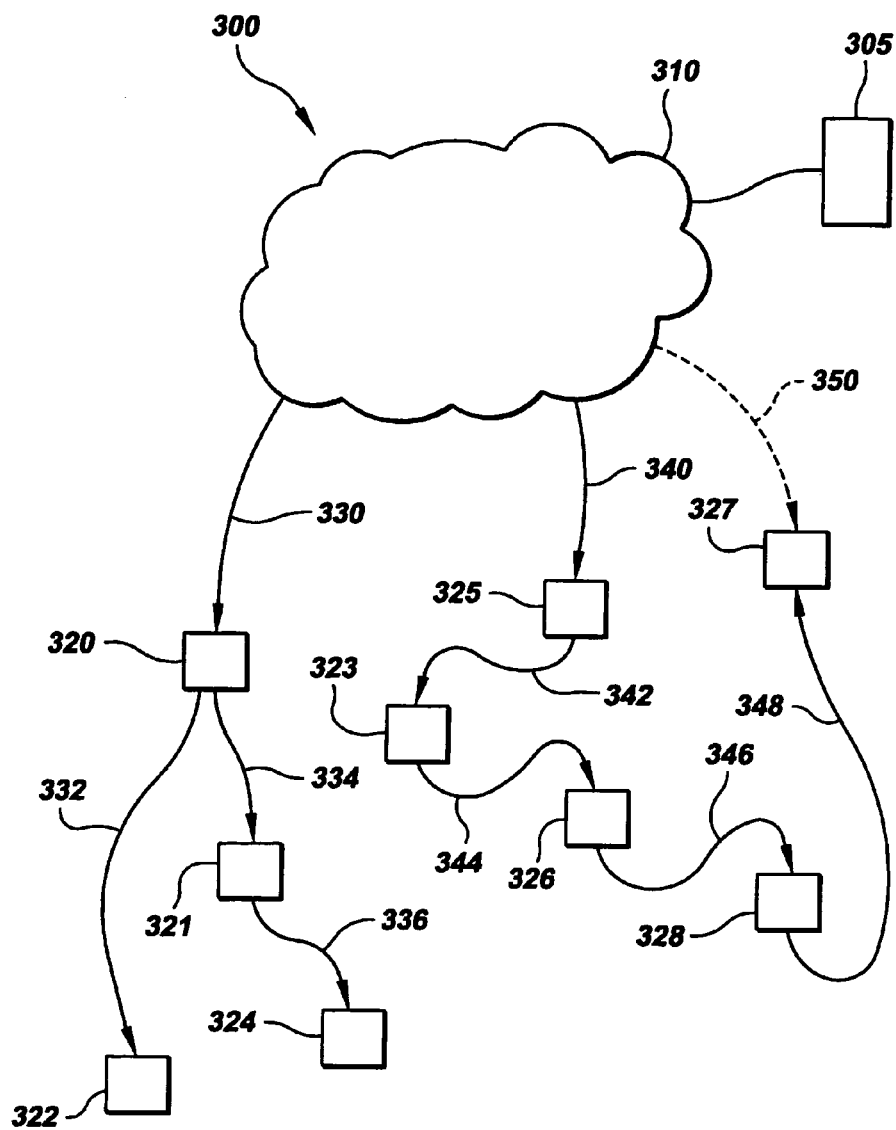
FIG. 3 is a network system adapted for management of peer to peer communications.

FIG. 3 is an implementation of the present invention to a peer-to-peer communications network 300, according to another example embodiment of the present invention. The network includes an application routing arrangement 305 and a plurality of system nodes 320–327 (e.g., end users) communicatively coupled to an IP communications network 310. The network is adapted to send seed data via communications links 330, 332 and 334, the seed data being used at the node and/or being transferred to additional nodes. The application routing arrangement 305 is adapted to direct routing to each system node using one or more of the system nodes for transferring the data and based upon the available time for making the data transfer.

For example, when nodes 322 and 324 request data, the application routing arrangement determines the available time for making the transfer and directs the routing of the data to each of the nodes in an efficient manner. In this instance, the data is first routed to node 320 via link 330, to node 321 via communications link 334, and to node 324 via communications link 336. Routing the data in this manner may, for example, cost less than routing the data directly from the network 310. In addition, when two or more nodes (e.g., nodes 321 and 324) request the same data, after routing to a first node 321, subsequent routing to a second node 324 can be effected without necessarily using the communications resources that would be required were the routing effected via other network communications links. In addition, once the data is routed to node 320 and has been subsequently routed to node 321, the same data can then be routed from node 320 to node 322 via communications link 332. This is particularly useful when the node 320 is adapted to store the entire amount of data to be transferred, or when the node includes a replicator adapted to produce two outgoing data streams, which allows simultaneous routing of the data to both nodes 322 and 324.

The present invention is directed to various manners for effecting the routing in FIG. 3, and each manner is selected to accommodate aspects of the communications network. In one implementation, network congestion, limitations of various communications links and other aspects of the network are used to determine the timing for data transfer. For example, when data needs to be delivered to node 327, the application routing arrangement 305 detects and/or predicts the ability of communications links 340, 342, 344, 346 and 348 for delivering the data. If the data transfer rate for link 348 is one hour, links 344 and 346 are each 0.5 hours, link 342 is 0.25 hours, and link 340 is 0.1 hour, data traveling to node 327 via nodes 325, 323, 326 and 328 must travel for at least 2.35 hours. If the predicted delivery time is too long, a separate communications link is used, such as seed link 350, for transferring data to the node 327.

In addition, it may be necessary to develop a data transfer buffer in order to accommodate variances in data transfer rates and in the ability of nodes to relay the data. The buffer relates to a time period and/or an amount of data stored at a particular node before delivering the data to a subsequent node. For instance, when data is to be delivered to node 322 via node 320 on communication links 330 and 332 in packets, a buffer that includes a selected amount of data (e.g., a number of packets) is established at node 320 before beginning transfer to node 322. If the application routing arrangement 305 detects that communications link 332 is slower than link 330, the buffer established at node 320 needs to be less than it would if the links were able to transfer at an equal rate. This means that data transfer from node 320 to node 322 can begin sooner after node 320 begins to receive data from the network than it would, if the link were faster. In addition, if the application routing arrangement 305 predicts that the communications link 332 may become unstable or congested, causing a reduction in speed at which data can be sent over the link to node 320, the buffer is increased to prevent a gap in the communication between nodes 320 and 322.

In another implementation, the communications network 300 is adapted to redirect data routing in response to a communications link becoming unavailable during a data transfer. This implementation is particularly useful, for example, when a communications link experiences a service interruption. When the communications link becomes unavailable, the application routing controller 305 detects the failure of the link and selects an alternate communications link to complete the data transfer. The data that has been sent is noted, and the transfer of the remaining data is initiated over the alternate communications link. For instance, when data is being transferred to node 327 via link 350 and the link becomes severed, the data is re-routed to node 327 via links 340, 342, 344, 346 and 348. In a more particular implementation, the application routing controller 305 monitors the unavailable communications link to detect when it becomes available again, and at that time re-initiates data transfer over the link.

Figure 4:
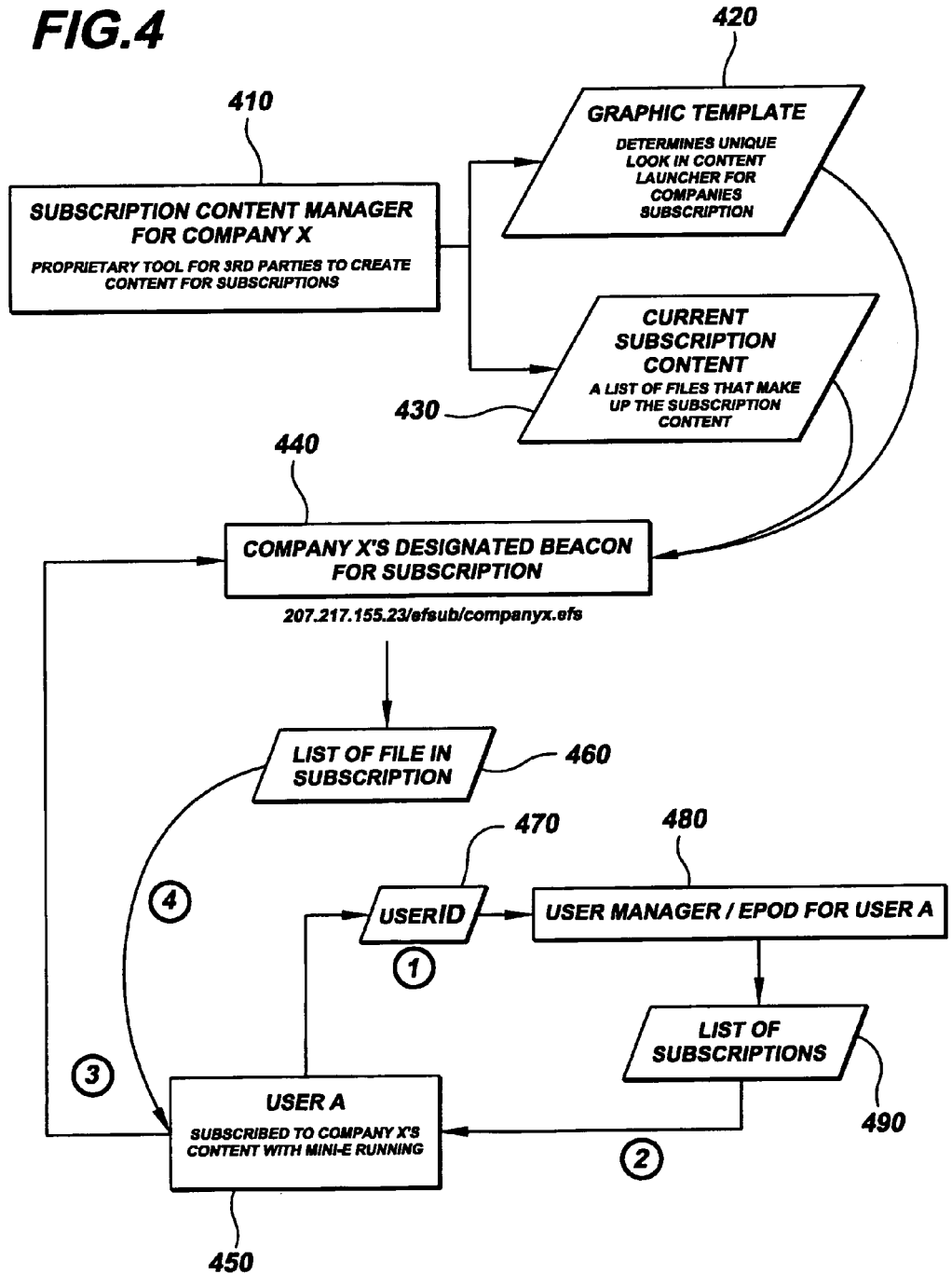
FIG. 4 is a system for monitoring and controlling subscription-based data movement on an IP network, according to another example embodiment of the present invention.

FIG. 4 is a system for monitoring and routing data on an IP network using subscription information, according to another example embodiment of the present invention. A subscription content manager 410 is adapted to manage subscription content for one or more companies and provides a graphic template 420 and a list of subscription content files 430. The content manager is programmed to establish the appearance and content of the graphic template, which can be tailored to a specific company's content or to a specific user and that user's subscription characteristics. The subscription content list includes files that make up the subscription content for a company using the system. For example, the subscription content may include video, audio, software, news articles or any type of data being offered for transfer over the network. The graphic template and the subscription content are supplied to a host control node 440 of the particular company to which they apply (labeled "Company X" by example).

A user ("User A") at a node 450 sends user identification data 470 to a user management node 480. In response, the user management node sends available subscription data 490 to the node 450. User A, having a subscription to at least a portion of Company X's content, sends a request from the node 450 to the host node 440 for available subscription content information from Company X. The host control node 440 then sends a list of files 460 available to node 450, and User A can then select files to which he or she has a subscription. Once the selection is made, data transfer of the selected files is effected in a conventional manner, or in a manner not inconsistent with those described herein.

Figure 5:
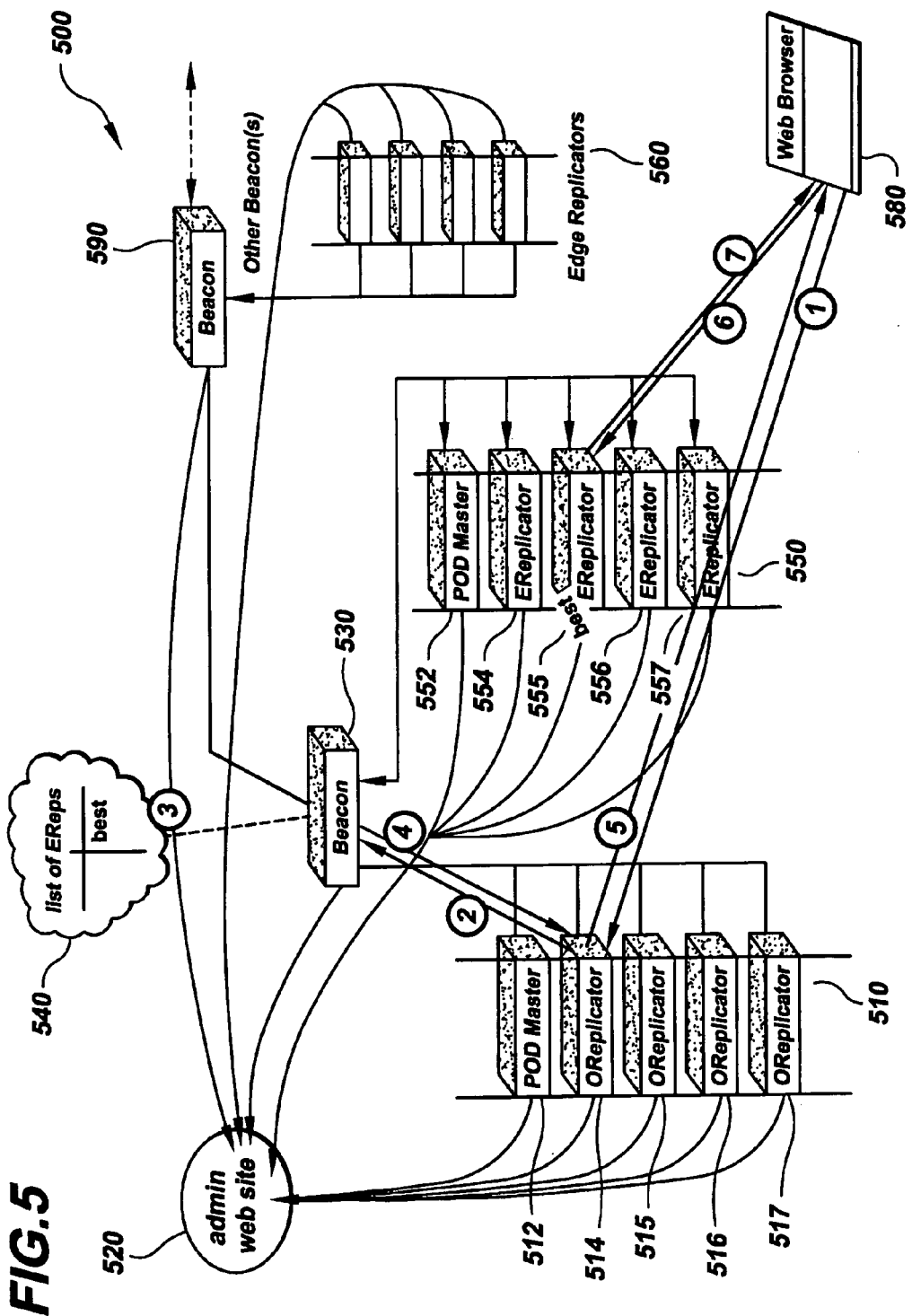
FIG. 5 is a system for data transfer on an IP network, according to another example embodiment of the present invention.

FIG. 5 shows a network system 500 adapted for monitoring and directing data transfer over an IP network, according to another example embodiment of the present invention. The system includes an administration host site 520 having an application router and coupled to various components in the network and adapted to provide administrative control over the components. An origin stack 510 is adapted to provide data to the network system using origin controller 512 and origin replicators 514–517. The origin replicators are adapted to replicate data from the origin controller 512 for seeding into the IP network via one or more application router nodes 530 and 590, such as a software-based network router application. Each application router node is coupled to one or more pods 550 and 560, each pod having a controller 552 and a plurality of replicators 554–557. The pods are adapted to replicate data and to provide the replicated data to a system node 580 in response to selections made by the user and as directed by the application router. In one particular implementation, the origin stack is adapted to pass node address information, such as that included in an HTTP "get" for obtaining data, to the pods for effecting the delivery to the system node 580.

One specific implementation of the system 500 is indicated by communications 1–7. A user at system node 580 sends a data request (1) using a web browser to the origin controller 512, which in turn sends a request (2) to node 530. A list of edge replicators 540 is used to determine a best routing option (3) of the requested data to the system node 580. The routing decision may include considerations discussed herein, such as least-cost routes, ensuring uninterrupted data transfer, and meeting transfer schedules, and selecting a replicator to use. This decision is sent (4) to the origin controller 512, which in turn relays (5) the decision of the best replicator to use to the system node 580. The system node then uses the decision and sends (6) a request for a transfer from the selected replicator 555, which sends (7) the requested data to the system node in response to the request. Similar communications can be carried on via other control nodes and pods (e.g., control node 590 and pod 560), and a multitude of users, transfer nodes and pods can be implemented to meet such needs.

Figure 6:
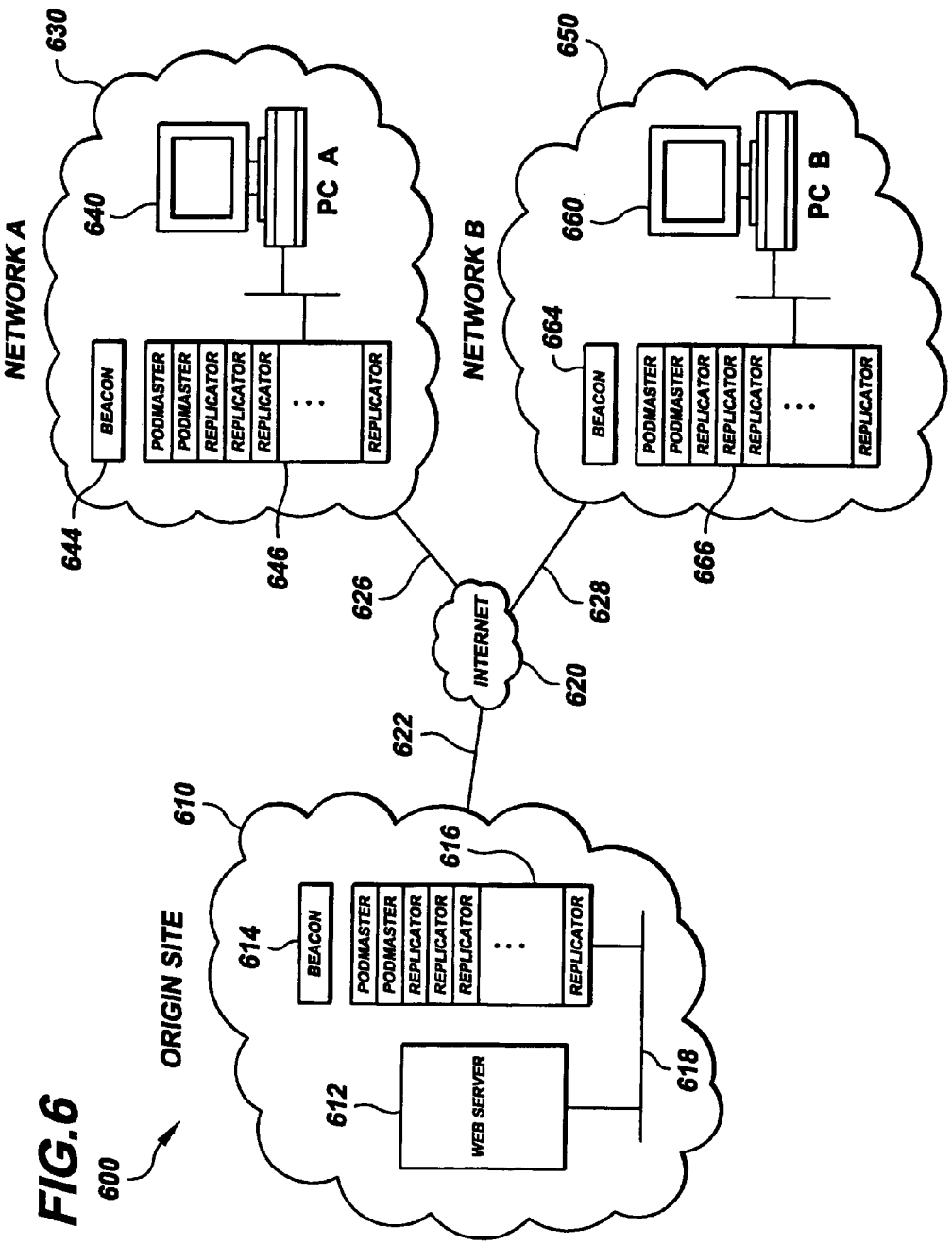
FIG. 6 is specific implementation of the present invention involving users coupled to an IP network via service providers, according to another example embodiment of the present invention.

FIG. 6 is a specific example embodiment of the present invention, wherein data transfer is monitored and directed for users coupled via service providers to an IP network system 600, using one or more of the applications described hereinabove. An origin site 610 includes a content provider/web server 612, an origin POD 616 (e.g. a stack as in FIG. 5) and an application router node 614, each coupled to a communications link 618. The origin pod is adapted to replicate data for seeding into an IP network 620.

The origin site is coupled via a communications link 622 to an IP network 620. The IP network is coupled to service providers 630 and 650 via communications links 626 and 628, respectively. Each service provider is coupled to an application router node 644 and 664, respectively, and to pods 646 and 666, respectively, including pod controllers and replicators, and to a plurality of users. FIG. 6 shows one user coupled to each service provider, with a personal computer 640 coupled to service provider network 630, and a personal computer 660 coupled to service provider network 650.

While the present invention has been described with reference to several particular example embodiments, those skilled in the art will recognize that many changes may be made thereto without departing from the spirit and scope of the present invention, which is set forth in the following claims.

What is claimed is:

1. A system for directing data over an internet protocol (IP) network, the system comprising:
   a plurality of remote network appliances adapted to receive data via the IP network;
   a network router communicatively coupled to the IP network;
   a plurality of source network nodes, each source network node including a computer programmed with application routing functions for providing, to the network router, information regarding data available at the source network node, and for routing data to a remote network appliance via the IP network;
   the network router adapted to receive said provided information regarding data available at the source network nodes and to respond to a request for data routing to one of the plurality of remote network appliances by ascertaining availability of the requested data at the plurality of source network nodes using information provided thereby, by selecting one of the source network nodes that bears the requested data and by communicating with the computer at the selected source network node to facilitate the data routing request; and
   wherein the computer at the selected source network node is adapted to respond to the communication from the network router by implementing the programmed application routing functions to route the requested data from the selected source network node to the remote network appliance specified in the request.

2. The system of claim 1, wherein the network router is further adapted to track the routing of requested data to the plurality of remote network appliances and to store information characterizing the tracked routing.

3. The system of claim 2, wherein the network router is further adapted to use the tracked routing to bill at least one of a user at a source network node and a user at a remote network appliance for data transferred to the remote network appliance from the source network node.

4. The system of claim 1, wherein the source network nodes provide information regarding data available at the source network node by providing information characterizing data-rich media content available at the source network node, and wherein the network router facilitates routing of the data-rich media content in response to a request therefore.

5. The system of claim 1, wherein the source network nodes are personal computers coupled to the Internet.

6. The system of claim 1, wherein the network router is adapted to identify a least-cost route for routing the requested data to the one of the plurality of remote network appliances and to communicate with the computer at the selected source network node to facilitate the data routing request by directing the computer at the selected source network node to route the requested data over the identified least-cost route.

7. The system of claim 1, wherein the network router is adapted to identify a route for routing the requested data as a function of a rate at which the requested data can be sent over the identified route, and to communicate with the computer at the selected source network node to facilitate the data routing request by directing the computer at the selected source network node to route the requested data over the identified route.

8. The system of claim 1, further comprising a buffer adapted to receive data routed from the computer at the selected source network node, to store at least a portion of the received data and, at a later time, to send the stored received data to the remote network appliance specified in the request.

9. The system of claim 1, wherein the network router is adapted to provide a graphic template and a list of content files to a remote network appliance, and to respond to a request for routing one of the content files to one of the plurality of remote network appliances by selecting one of the source network nodes that bears the requested content file and by communicating with the computer at the selected source network node to facilitate the data routing request.

10. The system of claim 1, wherein the network router administratively controls the computer at the selected source network node to facilitate the data routing request.

11. The system of claim 1, wherein the network router provides authorization for a particular user submitting the request for data routing to one of the plurality of remote network appliances, and communicates with the computer at the selected source network node to facilitate the routing request in response to the provided authorization.

12. The system of claim 1, wherein the network router is adapted to monitor data traffic on communication links available for use in routing the requested data, and to select one of the available communication links as a function of the monitored data traffic.

13. The system of claim 1, wherein
   the network router is adapted to detect delivery-related characteristics of available communication links for routing data, the delivery-related characteristics including at least one of: data transmission accuracy, data transmission speed, data transmission security and data transmission time, and
   the network router is adapted to communicate with the computer at the selected source network node to facilitate the data routing request by selecting one of the available communications links as a function of the detected delivery-related characteristics and by facilitating routing of the requested data over the selected one of the available communications links.

14. The system of claim 13, wherein the network router is adapted to delay transfer of the requested data in response to detecting a delivery-related characteristic of a selected communications link indicating that the selected communications link is unable to handle additional data transfer.

15. The system of claim 1, wherein the network router is programmed to track and report information regarding transfer of requested data.

16. The system of claim 1, wherein one of the source network nodes is programmed to track and report the transfer of requested data from the one of the source network nodes.

17. The system of claim 1, wherein a computer at a particular source network node is programmed with application routing functions for providing, to the network router, information regarding streaming data available at the particular source network node, and for streaming data to a remote network appliance via the IP network, and wherein the network router receives said provided information regarding the available streaming data and responds to a request for streaming data at one of the plurality of remote network appliances by ascertaining availability of the requested streaming data at the particular source network node using information provided thereby, and by communicating with the computer at the particular source network node to facilitate the streaming data routing request; and wherein the computer at the particular source network node is adapted to respond to the communication from the network router by implementing the programmed application routing functions to stream the requested streaming data from the particular source network node to the remote network appliance specified in the request.

18. The system of claim 1, wherein the at least one of the remote network appliances is adapted to decrypt the routed data to make it available for use.

19. The system of claim 1, wherein the network router is adapted to detect the amount of traffic on a portion of the IP network and to communicate with the computer at the selected source network node to facilitate the data routing request by directing the source network node to route the requested data as a function of the detected amount of traffic.

20. The system of claim 1, wherein the network router is adapted to respond to a request for data routing that includes a routing priority, and to communicate with the computer at the selected source network node to facilitate the data routing request as a function of the routing priority.

* * * * *